United States Patent [19]

Heller, Jr. et al.

[11] 4,019,758

[45] Apr. 26, 1977

[54] BOOK BINDING PROCESS

[75] Inventors: William C. Heller, Jr., Milwaukee, Wis.; Leonard Shatzkin, Croton-On-Hudson, N.Y.

[73] Assignee: William C. Heller, Jr., Milwaukee, Wis.

[22] Filed: Mar. 8, 1976

[21] Appl. No.: 665,007

Related U.S. Application Data

[60] Continuation-in-part of Ser. No. 335,555, Feb. 26, 1973, abandoned, which is a division of Ser. No. 74,271, Sept. 22, 1970, Pat. No. 3,370,806.

[52] U.S. Cl. .............................. 281/21 R; 11/1 AD; 156/273; 281/29

[51] Int. Cl.² ...................... B29C 19/02; B42D 1/00

[58] Field of Search ........... 281/21 R, 29; 11/1 AD; 156/274, 273

[56] References Cited

UNITED STATES PATENTS

| | | | |
|---|---|---|---|
| 2,579,488 | 12/1951 | Freeman | 281/21 R |
| 2,968,336 | 1/1961 | Martin et al. | 11/1 AD |
| 3,093,396 | 6/1963 | Segreto | 281/21 R |
| 3,454,442 | 7/1969 | Heller | 156/273 |
| 3,548,431 | 12/1970 | Hall et al. | 11/1 AD |
| 3,574,031 | 4/1971 | Heller et al. | 156/273 |

*Primary Examiner*—Jerome Schnall
*Attorney, Agent, or Firm*—Andrus, Sceales, Starke & Sawall

[57] ABSTRACT

An improved process of attaching a book body to a case at the hinge to form a hard bound book. A liquid thermoplastic bonding agent is applied to the body or case at the hinge area. The bonding agent is allowed to dry and form a solidified layer. The body is then inserted into the case so that the portion to which the agent has been applied is located at the hinge of the completed book. The dried bonding agent is heatable upon exposure to an alternating electric field and melts to form the attachment at the hinge area. Pressure applied to the hinge area assists in forming the attachment and reduces the thickness and heat generation of the layer.

5 Claims, 4 Drawing Figures

BOOK BINDING PROCESS

CROSS REFERENCE TO RELATED APPLICATION

This application is a continuation-in-part application of copending application SER. No. 335,555, filed Feb. 26, 1973, now abandoned, which application is a divisional application of application Ser. No. 74,271, filed Sept. 22, 1970, now U.S. Pat. No. 3,370,806 dated May 1, 1973.

BACKGROUND OF THE INVENTION

Field of the Invention

The present invention is directed to the book binding process, and more particularly to the step of the book binding process termed in the art "casing in."

Description of the Prior Art

The ordinary hard bound book consists of two main parts, the case and the body. The case comprises the front and the back covers connected by the spine. The covers are hinged along either edge of the spine. An indentation or groove in the case at the spine edges allows the cover to be opened and closed easily.

The body of the book is comprised of a plurality of paper sheets termed leaves. The leaves are typically sewn together along their center folds in groups of sixteen or more to form the sections or signatures of the book. The signatures are assembled by additional sewing, binding to tapes or cords, or the like, to form the body of the book. At the front and back of the body are affixed heavy folded pages, termed the end papers, which facilitate the attachment of the body to the case.

To effect this attachment, the center of a piece of fabric,, termed crash, is glued to the centerfolds of the body signatures. The ends of the crash extend along the outside of the end papers on either side of the body. The body is then inserted in the case so that the folds in the end papers are adjacent the spine of the case. Paste is applied to both sides of the crash and to the sides of the front and back end papers adjacent the insides of the covers of the case. The end papers are pasted to the inside of the covers, enclosing the crash. The case and body are then placed in a press to form the groove at either edge of the case spine. When the attachment process, termed casing in, is complete, the body is bound to the case at the hinge so that the covers and leaves are movable with respect to each other.

From the standpoint of durability and utility of the completed book, the hinge forms a most critical portion thereof. The hinge must have sufficient flexibility to permit the covers to open and close easily and to lie flat when the book is in use. On the other hand, the hinge must have sufficient strength to retain the body in the case under conditions of normal wear and tear throughout the useful life of the book.

The creation of satisfactory book hinges having the desired qualities of flexibility and strength makes severe demands on the bonding materials and techniques employed in the book binding process and becomes particularly critical with the high processing speeds employed in modern book binding methods.

When assembling a book with conventional book binding paste of the starch or animal variety, continuous application of pressure to the hinge area of the bound book is desirable until the paste is dry or at least until it has set in order to form a satisfactory hinge. The application of pressure is necessary, in part, to overcome the natural springiness of the materials which tends to separate the hinge. Such conditions have not been previously obtainable at the process speeds employed in commercially and economically feasible book binding processes, with the result that pressure is prematurely removed from the book causing faulty bonding in the hinge.

One expedient commonly employed to improve the quality of bound book hinges is to carefully stack the books after binding so that no strain is on the hinge area. The books are left in this condition for a period of time, typically 24 hours, before shipping. Pressure is thus applied to the books as the paste dries. While this technique is simple and feasible to some extent, it leaves much to be desired in terms of uniformity and control of pressure. The extra handling and storage of the stacked books increase the cost of the book binding process.

A second expedient has been to accelerate the drying of the paste. For this purpose, the press used to form the hinge is equipped with heated press plantens so that heat, as well as pressure, is applied to the book undergoing binding. However, the heat of the platens must pass through the cover in order to reach the paste on the inside thereof. Typical cover materials include multi-layer carboard and buckram, both of which tend to be good thermal insulators. Thus, considerable time is required for this directly applied heat applied heat to pass through the case to the paste area and the desired bonding result is not achieved without an unwanted reduction in the speed of the binding process.

While higher platen temperatures may be utilized to increase the rate at which heat passes to the paste area, the point is quickly reached at which scorching and degradation of the case and body materials becomes likely. Thus, the use of heated press platens has not achieved the desired result of increasing binding speed without undue loss of hinge quality.

Another drawback of prior art binding processes is that the paste when it reaches the point at which pressure is applied in the casing-in line, may have reached different degrees of drying. This may be due to variations in the viscosity of the paste from time to time, even from the same batch, or to differences in the paste from batch to batch, or to differences in the climate conditions in the binding room, or to changes in the operating speed of the machine, or for a number of other reasons. This results in variations in the bond of the hinge joint obtained during casing-in.

It is thus characteristic of prior art casing-in processes that books so bound vary in strength at the hinge joint very widely, even though they are manufacutured in one batch sequentially one after the other.

Yet another expedient which has been used is to employ hot melts. These substances comprise or resemble waxes and are applied to the book parts in the molten form. The parts are quickly assembled while the hot melt remains molten and the subsequent solidification of the hot melt affixes the body to the case.

However, such substances are difficult to handle and apply and are low in strength. Commercially feasible hot melts have a fairly long solidification period, for example, seven seconds, so that only modest increases in processing speed are obtainable. It may be difficult to apply pressure to the hot melt while it is molten.

SUMMARY OF THE PRESENT INVENTION

It is therefore the object of the present invention to provide an improved process of casing-in bound books which enhances the quality and uniformity of quality of the hinge formed during the casing-in operation while maintaining or increasing processing speeds.

It is a further objects of the present invention to provide an improved process of casing-in which permits the case and body of the book to be formed in the normal manner increasing processing speeds.

It is a further object of the present invention to and which permits, insofar as is possible, use of conventional book binding techniques, thereby permitting the use of existing book binding equipment.

It is another object of the present invention to provide an improved process of casing-in which may be used in conjunction with conventional book binding techniques to reinforce the book hinge.

In summary, the present invention provides an improved process of casing-in including the step of applying a thermoplastic bonding agent which is heatable upon exposure to an alternating electric field. The bonding agent is applied in liquid form at room temperature to the body and/or case adjacent the hinge area. The bonding agent thereafter dries to a solidified layer which is non adhesive and which prossesses sufficient thickness to provide rapid melting of the bonding agent upon exposure to the field.

The body of the book is inserted into the case so that the portion having the bonding agent applied thereto is located at the hinge. This insertion may be easily accomplished since the bonding agent is in the solidified, non adhesive, state. The portion is then exposed to the alternating electric field to quickly melt the bonding agent to an adhesive state. Pressure is applied to the preassembled hinge area during exposure of the bonding agent to bring the parts together and form the hinge. In contrast to prior hot melt processes in which pressure was difficult or impossible to apply during the molten period, with the present invention pressure may be easily and continuously exerted throughout the entire period during which the bonding agent is molten. A high quality bond is thus formed. The rapid melting of the bonding agent also facilitates the bonding process. The pressure application reduces the thickness of the molten bounding agent layer. This reduces the heat generation in the bonding agent. The process of the present invention thus tends to be self-controlling in that the reduced thickness of the layer provides the reduced heating required during the terminal portions of the process.

BRIEF DESCRIPTION OF THE DRAWINGS

FIGS. 2 through 4 show the book hinge in a somewhat exaggerated form to facilitate an understanding of the present invention.

DESCRIPTION OF THE PREFERRED EMBODIMENT

Figure 1:
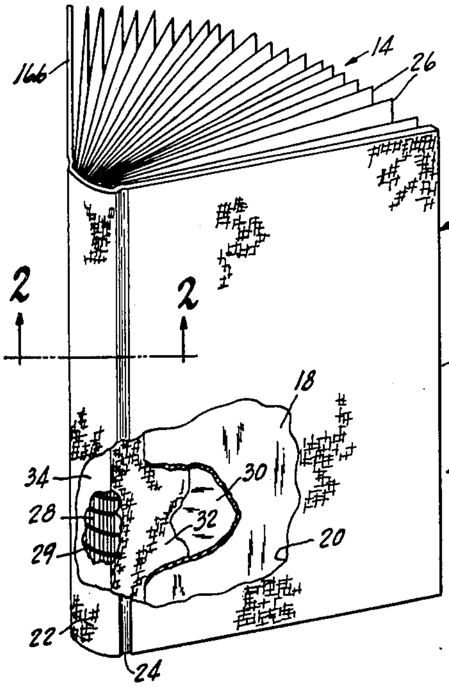
FIG. 1 is a perspective view of a typical hard bound book, a portion of the hinge area of the book being broken away to reveal the construction thereof.

Turning now to FIG. 1, there is shown therein an assembled hard bound book 10 comprised of case 12 and body 14. Case 12 includes front cover **16*a* and back cover 16*b*, each of which is formed of board 18 covered with buckram cloth 20. Buckram cloth 20 connects the boards at spine 22. A groove 24** formed in the buckram at either edge of the spine permits the covers to hinge on the spine.

The body 14 of book 10 is formed of a plurality of leaves 26 folded on a center fold and sewn together to form signatures 28 which are sewn on cords 29 to form body 14. End papers 30 are affixed to the front and back of the body so as to abut the inner surfaces of front and back cover boards 18.

The crash 32 is affixed to the center folds of the assembled signatures across cords 29 and extends along the exterior surface of the end papers between the cover boards and the end papers. If desired, the portion of crash 32 adjacent the spine of the book may be covered with kraft paper 34.

A bonding agent suitable for joining the parts of book 10 and having the necessary properties for successful practice of the present invention may be formed by selecting an adhesive thermoplastic carrier and dispersing therein a material susceptible to heating by the alternating electric field. The material is preferably in particulate form and is incorporated in the carrier in quantities sufficient to produce the desired heating action. This is typically 10 to 50% by weight with respect to the carrier. Such material, termed herein a susceptor, may be dielectrically heatable substance such as polyvinyl chloride.

The carrier is dryable liquid, typically resin in latex or an emulsion form. A typical carrier which has been found useful in the process of the present invention is the water emulsion of ethylene vinyl acetate sold under the trade designation Aircoflex 400 by Air Reduction Co., New York, New York.

In some cases, where an alternating electric field is being used, it may be possible to select a dielectrically heatable substance which itself may act as the bonding agent.

Figure 2:
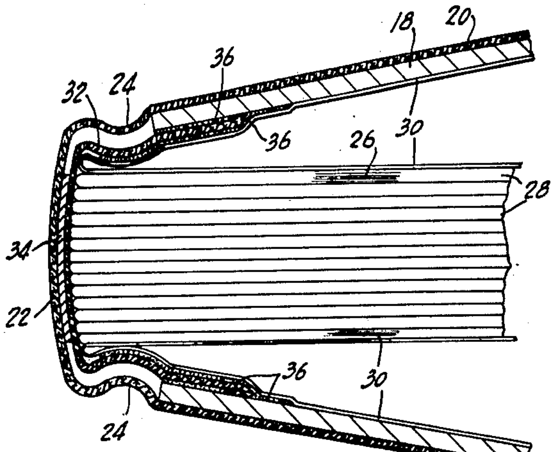
FIG. 2 is a cross sectional view taken generally along the line 2—2 of FIG. 1, showing in detail a hinge of a book and showing the initial step of the casing-in process of the present invention.

The bonding agent, formed as described above, is applied to the book portions to commence the casing in operation. As shown in FIG. 2, the bonding agent, identified by numeral 36, may contact both sides of crash 32 adjacent hinge 24 as well as the inside of boards 18 of covers **16*a* and 16*b* and the outsides of end papers 30. It may be applied to a desired combination of the above mentioned surfaces. The bonding agent 36 is thereafter allowed to assume a solid, nonviscid state before further processing of book 10**. This facilitates further bonding of the portions of the book and reduces unwanted smearing, adhesion, and the like.

The bonding agent is applied in a layer having a thickness which provides a quantity sufficient to enhance the dielectric heating properties of the layer thereby to provide rapid melting of the bonding agent upon exposure to the high frequency electric field. Undesirable heat dissipation is also reduced.

Body 14 is inserted in case 12 with that portion of crash 32 located across the center folds of signatures 28 abutting spine 22. This locates the portions of crash 32, or end papers 30, to which bonding agent 36 has been applied at hinge 24. In the case where bonding agent 36 has been applied to case 12, this places crash 32 and end papers 30 adjacent the treated portions of case 12.

The bonding agent is then exposed to the alternating electric field as by inserting hinge 24 into the electric field created by electrodes 50 energized by alternating current voltage source 52.

Upon insertion in the field of electrodes 50, heat is generated in the susceptor of the bonding agent causing the agent carrier to melt and commence the bonding process.

Figure 3:
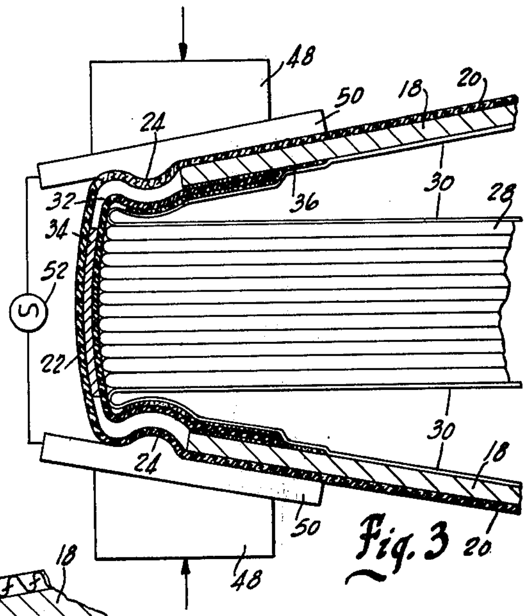
FIG. 3 is a cross sectional view similar to FIG. 2, showing subsequent steps in the process of the present invention.

During the time bonding agent 36 is in the molten state, pressure is applied to book 10 in the area of hinge 24. While separate pressure applying means may be used, it is advantageous to utilize the pressure applying means, platen 48, as the support for electrodes 50, as shown in FIG. 3. Pressure is applied in the direction of the arrows in FIG. 3.

The pressure applied by platens 48 brings the various elements of the book into contact at the hinge area to effect joinder of the book parts. The pressure so applied also reduces the thickness of the layer of bonding agent 36. This reduces the heat generating capability of the bonding agent so as to avoid excessive heat generation in the concluding stages of the bonding process.

Removal of book 10 from the field of electrodes 50, or the turn off of alternating current voltage source 52 initiates the termination of the period of adhesiveness in a thermoplastic carrier. This period of adhesiveness or open line is on the order of 1 second. The pressure continues until the termination of the period of adhesiveness of bonding agent 36.

When bonding agent 36 has set, the casing in of book 10 is complete. Because pressure may be applied during the entire time bonding agent 36 is setting, a highly satisfactory hinge joint is obtained through the adhesion and continuity throughout the hinge area. There is also considerably less variation in the quality of the hinge joint then has heretofore been experienced.

Figure 4:
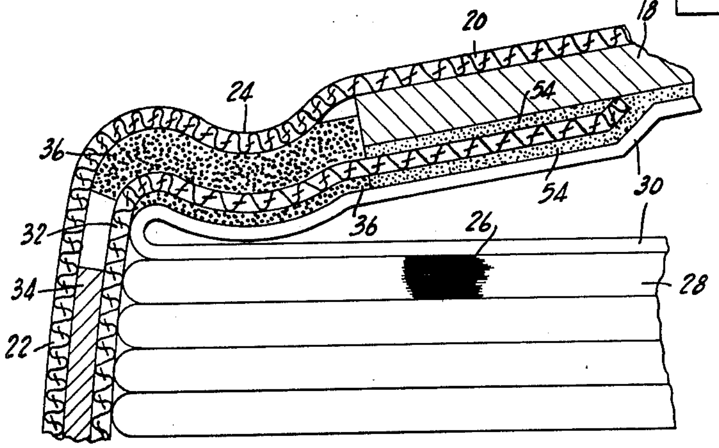
FIG. 4 is a cross sectional view similar to FIG. 2, showing a modification and the casing-in process of the present invention.

The process of the present invention may also be used to reinforce the hinges of books cased-in in the normal manner. Bonding agent 36 is placed in hinge 24 at the points of joinder or at points of excessive stress and wear, as shown in FIG. 4, adjacent the conventional paste 54. Bonding agent 36 is treated in the manner described above to insure that adequate bonding occurs at the aforesaid points, thereby to improve the strength and durability of hinges 24. With the critical points of the hinge joint bonded by bonding agent 36, the conventional paste may dry in the ordinary manner and without pressure without affecting the quality of the hinge.

Various modes of carrying out the invention are contemplated as being within the scope of the following claims particularly pointing out and distinctly claiming the subject matter which is regarded as the invention.

We claim:

1. An improved process of forming a bound book of conventional construction by affixing the end papers and crash of a body of leaves inside the covers of the case, said end papers and crash and covers having portion suitable for being brought into abutment to form a joint having a first region defined by the end papers and boards of the covers and having a second hinge region which is subjected to stress during use of the book, said process employing conventional book binding paste in said first region and a solidifiable flexible thermoplastic bonding agent meltable to assume a viscid state of short duration responsive to exposure to a high frequency electric field in said second region, said process comprising the steps of:

applying conventional book binding paste to an abuttable portion of at least one of the body and case in the first region of the joint;

applying a layer of the bonding agent in liquid form to an abuttable portion of at least one of the body and case in the second hinge region, said layer being applied in a thickness which provides a quantity of bonding agent sufficient to generate rapid melting of the bonding agent upon exposure to the high frequency electric field;

allowing the bonding agent to assume a solid, nonviscid state;

inserting the body into the case to form the joint from the abuttable portions of the body and case, the second hinge region of said joint containing the nonviscid bonding agent;

exposing the second region to a high frequency electric field to rapidly melt the bonding agent;

applying pressure to the joint of the book containing the bonding agent during the period of viscidness of the bonding agent to bring the abutting portions of the joint into bonding contact to effect an attachment and to reduce the thickness of the bonding agent and the generation of heat in the bonding agent; and allowing the conventional book binding paste to dry while said joint is held in position by the bonding agent.

2. The improved process according to claim 1 including an initial step of forming bonding agent by dispersing particles of susceptor material heatable upon exposure to a high frequency electric field in a thermoplastic carrier to form the bonding agent.

3. The improved process according to claim 2 wherein the step of forming the bonding agent is further defined as dispersing particles of a polyvinyl chloride susceptor in the carrier.

4. The improved process according to claim 1 including an initial step of forming a bonding agent by selecting a dielectrically heatable thermoplastic substance.

5. The improved process according to claim 1 wherein the step of applying the bonding agent is further defined as applying the bonding agent to the crash at the selected interfacial area of the hinge to bond the crash to the interior of the case.

* * * * *